United States Patent [19]

Beatty et al.

[11] Patent Number: 5,340,298
[45] Date of Patent: Aug. 23, 1994

[54] DIVIDER ASSEMBLY

[75] Inventors: David E. Beatty, Wrenshall, Minn.; Jeffery A. Nyquist; Kenneth Ropp, both of Superior, Wis.

[73] Assignee: Dutchess Bakers' Machinery Co., Inc., Superior, Wis.

[21] Appl. No.: 127,953

[22] Filed: Sep. 28, 1993

[51] Int. Cl.[5] .............................. A21C 3/10; A21C 5/08
[52] U.S. Cl. .................................. 425/183; 425/186; 425/189; 425/196; 425/295; 425/298; 425/300
[58] Field of Search ............... 425/185, 186, 297, 298, 425/332, 292, 295, 300, 181, 182, 296, 192 R, DIG. 109, DIG. 248, 183, 196, 189

[56] References Cited

U.S. PATENT DOCUMENTS

| 507,063 | 10/1893 | Bertram | 425/300 |
|---|---|---|---|
| 536,830 | 4/1895 | Hetherington | 425/300 |
| 1,144,952 | 6/1915 | Ward | 425/300 |
| 1,177,835 | 4/1916 | Houten | 425/300 |
| 1,761,399 | 6/1927 | Kremmling | 425/300 |
| 1,764,586 | 6/1930 | Houten | 425/300 |
| 2,158,594 | 5/1939 | Seem | 425/332 |
| 4,898,528 | 2/1990 | Willard et al. | 425/185 |
| 4,950,147 | 8/1990 | Willard et al. | 425/186 |
| 4,984,978 | 1/1991 | Beatty | 425/186 |

Primary Examiner—Khanh Nguyen
Attorney, Agent, or Firm—Palmatier, Sjoquist & Helget

[57] ABSTRACT

A divider assembly for removable attachment to a dividing and rounding machine, the assembly including a divider blade formed into a circular geometric pattern, with relatively movable plugs fitted into the openings of the geometric pattern, the blade being affixed to a divider plate having openings and the plugs projecting through the openings. The top ends of the plugs are fitted through a plug plate and have reduced diameter shanks for engagement into keyhole-shaped openings in a lock plate. Two knobs are threadable into the respective plates to hold the entire assembly together.

10 Claims, 3 Drawing Sheets

DIVIDER ASSEMBLY

BACKGROUND OF THE INVENTION

This invention relates generally to dough-dividing and rounding machines, typically finding utility in the bakery industry. More particularly, the invention relates to a divider assembly for removable attachment to a dough-dividing and rounding machine. The invention finds its greatest utility in the ease of assembly and disassembly, thereby permitting a significant improvement in the task of cleaning such machines, and reassembling the machine components after cleaning.

Examples of dough-dividing machines which are disclosed in the earlier prior art may be found with reference to U.S. Pat. No. 1,177,835, issued Apr. 14, 1916; U.S. Pat. No. 1,764,586, issued Jun. 17, 1930; and U.S. Pat. No. 2,158,594, issued May 16, 1939. The general structure and operation disclosed in these prior art patents is frequently found in use today in machines of generally similar design.

Dough-dividing machines of the prior art, and particularly the divider assemblies utilized in such machines, suffer from disadvantages relating to the ease of disassembly for purposes of cleaning the machine and its component parts. A typical and common problem with prior art machines is that partial disassembly of the machine for purposes of removing the divider assembly for cleaning is either impossible or extremely difficult, with the result that cleaning of divider assemblies on prior art machines is usually accomplished while the divider assembly is mounted on the machine. In those machines where the divider assembly may be removed for cleaning, the assembly itself contains many uneven surfaces and recesses, the cleaning of which is very difficult, and it is therefore not uncommon for dough residue to remain on parts of the divider assembly for long periods of time. This creates an unhealthy and unsafe environment which promotes the growth of bacteria.

Several more recently issued patents have attempted to address the problem of designing a divider assembly which is easier to disassemble and clean than found on the earlier prior art machines. Examples of these more recent improvements and divider assemblies are found in the following prior art patents: U.S. Pat. No. 4,898,528, issued Feb. 6, 1990; U.S. Pat. No. 4,950,147, issued Aug. 27, 1990; and U.S. Pat. No. 4,984,978, issued Jan. 15, 1991. The foregoing patents disclose divider assemblies which are disassembleable into component parts, and thereby offer the advantage of easier cleaning, but these divider assemblies suffer the disadvantage that the divider assemblies are still difficult to separate into their component parts without the use of tools.

SUMMARY OF THE INVENTION

The present invention comprises a divider assembly which, for cleaning purposes, may be disassembled and reassembled without the use of tools. The invention comprises a locking plate which is removably engageable to a plurality of stems which are each affixed to a plug. The locking plate may be slidably moved to either engage or disengage from the plurality of stems and thereby facilitate the assembly/disassembly of the entire divider assembly without the further use of tools.

It is the principal object of the present invention to provide a divider assembly which may be assembled and disassembled without the use of tools.

It is another object and advantage of the present invention to provide a divider assembly having a plurality of stacked components which are held in engagement together by a plurality of stems engaging a slidable locking plate.

Other and further objects and advantages of the invention will become apparent from the following specification and claims, and with reference to the appended drawings.

DESCRIPTION OF THE PREFERRED EMBODIMENT

Figure 1:
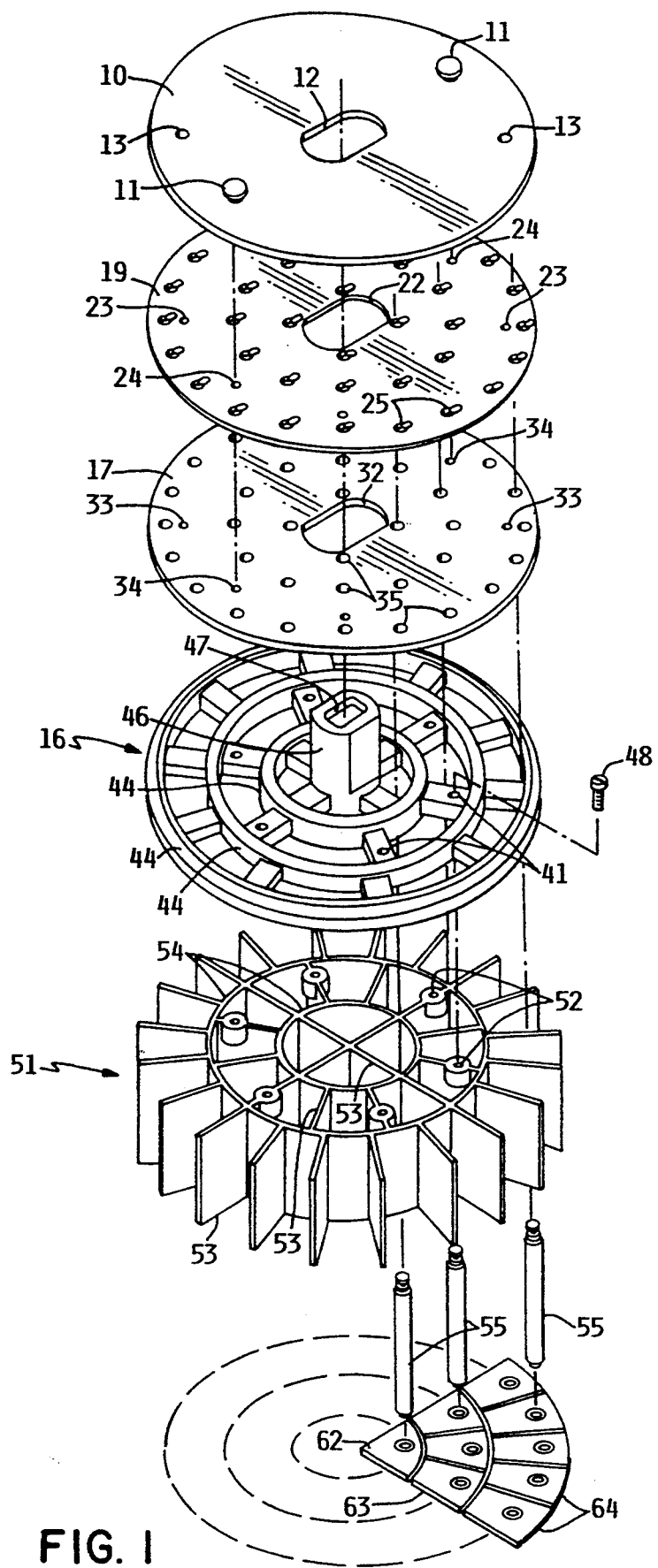
FIG. 1 shows an exploded isometric view of the invention.

Referring first to FIG. 1, there is shown an exploded and isometric view of the divider assembly. A cover 10 forms a topmost plate of the divider assembly. A pair of knobs 11 project upwardly above cover 10, each of the knobs 11 have a downwardly projecting threaded portion for engaging into threads in a plug plate 17, after passing through aligned openings in a lock plate 19. Cover plate 10, lock plate 19, and plug plate 17 each have a central keyed opening therethrough, all of which are alignable when the assembly is secured together. The keyed opening in cover plate 10 is identified as opening 12. Additionally, cover plate 10 has a pair of openings 13 which are alignable with similar openings 23 in lock plate 19 and threaded holes 33 in plug plate 17 for attaching the divider assembly to a dividing and rounding machine. Reference is made to U.S. Pat. No. 4,950,147 and 4,898,528, for a description of a dividing and rounding machine which is generally operable with the present invention. Cover plate 10 may be made from a synthetic material such as Lexan, nylon, etc.

Lock plate 19 is the same size as cover plate 10, and has a similar keyed center opening 22 therethrough. Lock plate 19 has a pair of openings 24 which are alignable with the threaded shafts of knobs 11. Lock plate 19 also has openings 23 which are alignable with openings 13 as described hereinabove. Lock plate 19 also has a plurality of openings in the shape of keyholes, for receiving a plurality of plug stems 55, as will be hereinafter described. All of the keyhole openings in lock plate 19 are formed in the same direction; i.e., the smaller portion of the keyhole opening is aligned relative to the larger portion of the keyhole opening identically in all cases. Lock plate 19 forms the second plate of the divider assembly, and may be made from a plastic material such as Lexan, nylon, plexiglass, etc.

Plug plate 17 forms the third plate of the divider assembly, and it similarly has a keyed central opening 32 which is alignable with openings 22 and 12. Plug plate 17 has a pair of openings 33 which are threaded in plug plate 17 to accept a threaded fastener from the dividing and rounding machine (not shown) which is also insertable through openings 13 and 23. Plug plate 17 also has a pair of threaded holes 34 for receiving the threaded shafts projecting downwardly from knobs 11, which shafts also project through aligned openings 24 in lock plate 19. Plug plate 17 also has a plurality of openings 35 which are alignable with keyhole openings 25 in lock plate 19. Plug plate 17 is preferably made from metal, such as aluminum or steel.

The fourth plate of the divider assembly is a divider plate 16, which is preferably formed of a metal casting. Divider plate 16 has an upwardly-projecting neck 46 which is alignable with and sized to project through central openings 32, 22, and 12 in their respective upper plates. Neck 46 has a keyed opening 47 for receiving an engagement key from the dividing and rounding machine (not shown). Divider plate 16 has a plurality of radiating spokes formed between concentric circular ribs 44 for purposes of engagement against a divider blade 51, to be hereinafter described. Six of the ribs in divider plate 16 have openings 41 therethrough for accepting threaded fasteners 48; threaded fasteners 48 are engageable into threaded holes 52 in the upper side of divider blade 51. Threaded fasteners 48 are typically secured into the threaded holes 52 in order to form a unitary assembly constituting divider plates 16 and divider blade 51. Once assembled, it is not generally necessary to separate the divider blade from the divider plate, for they may be readily cleaned when they are affixed together as a single subassembly.

Divider blade 51 is formed of a plurality of radially-projecting blades 53, some of which extend between concentric circular blades 54, to form a one-piece relatively rigid divider blade assembly. The concentric blades 54 of divider blade 51 are sized so as to be alignable with the concentric ribs 44 in divider plate 16. Divider blade 51 may be made from a plastic or metal material.

A plurality of plugs are sized to fit the respective openings between all of the divider blade segments formed in divider blade 51. FIG. 1 illustrates the geometric arrangement of plugs arranged to fill one-fourth of the openings in divider blade 51, it being assumed that three other similar sets of plugs are required for the entire circular pattern. A center plug 62 is sized to fit within each of the four center openings in divider blade 51; a plurality of intermediate plugs 63 are sized to fit within each of the respective openings in divider blade 51 which are found between the concentric blade segments; a plurality of outer plugs 64 are sized to fit within each of the outer blade segments around the periphery of divider blade 51. Each plug has affixed to it a plug stem 55. Plug stems 55 may be affixed to the respective plugs by means of threadable ends, or by means of welding or other fastening techniques as may be deemed appropriate. In each case, plug stems 55 project upwardly through respective openings in divider blade 51, divider plate 16, plug plate 17, and lock plate 19.

Figure 2A:
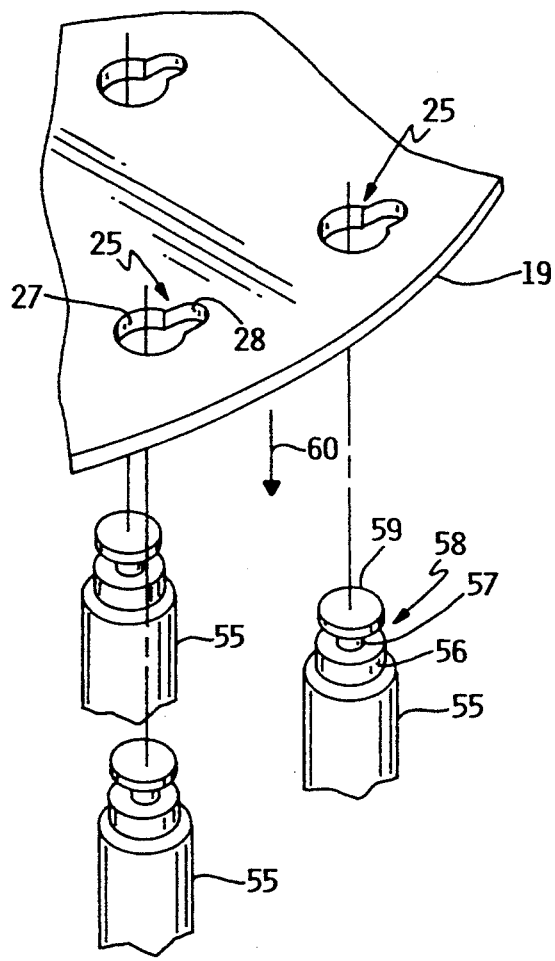
FIG. 2A shows an enlarged portion of the locking plate in isometric view.

FIG. 2A shows a partial perspective view, illustrating the engagement relationship of plug stems 55 into lock plate 19. For purposes of clarity, plug plate 17 is not shown in FIG. 2A. Each of the keyhole openings 25 is formed of an enlarged circular portion 27 and a smaller circular portion 28. In all cases, the relative orientation of circular portions 27 and 28 are consistent, so that all keyhole openings 25 are generally oriented in the same alignment on lock plate 19. The upper end 58 of plug stem 55 comprises several engagement features. A reduced diameter shoulder 56 is sized to fit within the openings 35 of plug plate 17, and the axial length of shoulder 56 is equal to the thickness of plug plate 17. Therefore, when plug stem 55 is inserted through an opening 35 in plug plate 17, the top edge of shoulder 56 is flush with the top surface of plug plate 17.

Figure 2B:
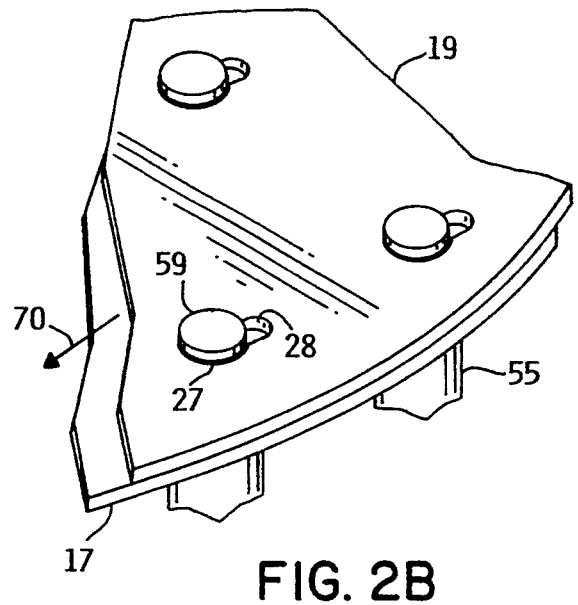
FIG. 2B shows an isometric view of a stem engaged in the locking plate.
Figure 2C:
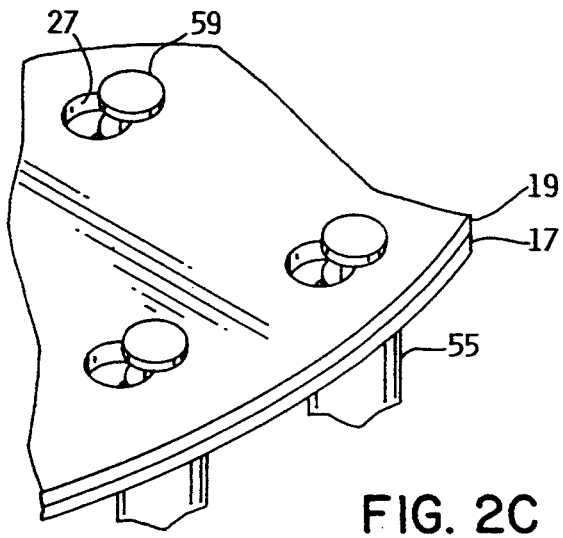
FIG. 2C shows an isometric view of the stem engaged and locked by the locking plate.

A circumferential groove adjacent shoulder 56 produces a region of further reduced diameter, shown as an engagement shank 57 in FIG. 2A. The engagement shank 57 has an axial length equal to or slightly greater than the thickness of lock plate 19, and the diameter of engagement shank 57 is sized to fit into reduced portion 28 of keyhole opening 25. The distal end 59 of plug stem 55 is of substantially the same diameter of shoulder 56, both of which are sized to fit into enlarged portion 27 of keyhole opening 25. The engagement of lock plate 19 onto the plurality of plug stem 55 is accomplished by moving lock plate 19 in the direction of arrow 60 to simultaneously engage all of the plug stems 55 into the respective keyhole openings 25. Of course, this presumes that plug plate 17 has been engaged with plug stems 55 prior to overlaying lock plate 19, as is shown in FIG. 2B. The openings 35 in plug plate 17 are first engaged with all of the plug stems 55, by dropping plug plate 17 downwardly to fit all of the plug stems 55 shoulders 56 into respective openings 35, as is shown in FIG. 2B. After this has been accomplished, lock plate 19 is lowered into engagement with all of the plug stems 55, wherein the respective enlarged portions 27 are fitted over the ends 59 of plug stems 55. Once the lock plate 19 has been seated as is shown in FIG. 2B, it is slidably moved in the direction of arrow 70 to engage all of the reduced portions 28 against the shanks 56, to reach the locked position which is illustrated in FIG. 2C. In this position, each of the ends 59 are fitted into locking engagement against the top surface of lock plate 19, and lock plate 19 is in coincident alignment with plug plate 17.

Figure 3:
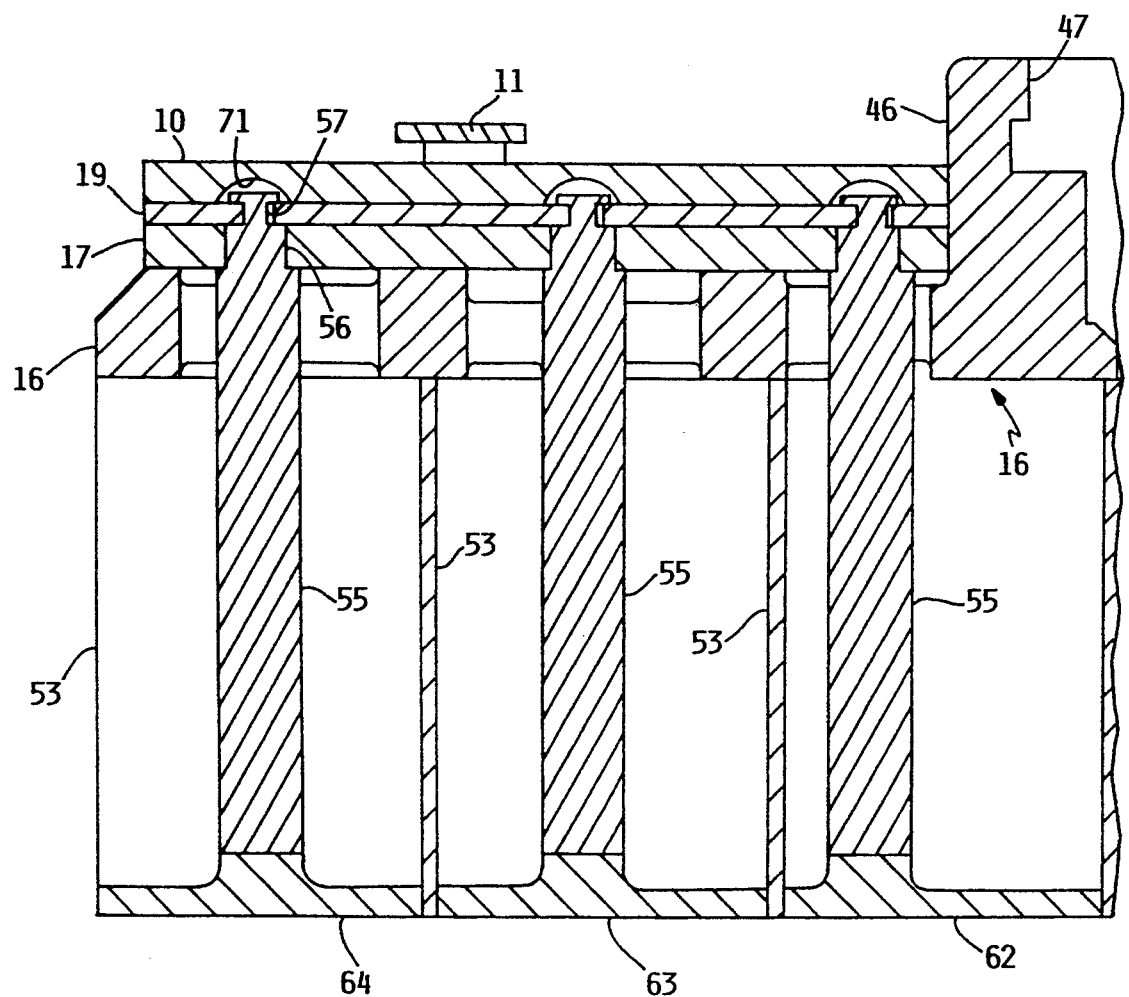
FIG. 3 shows a cross-sectional view of a portion of the divider assembly.

FIG. 3 shows a cross-sectional view of the completed assembly. In this position, reduced diameter shoulders 56 of all of the plug stems 55 are engaged into the openings 35 of plug plate 17. Further, the shank portions 57 of plug stems 55 are engaged into reduced diameter portions 28 of keyhole openings 25. Further, the ends 59 of plug stems 55 are locked against the top surface of lock plate 19. A plurality of recesses 71 are formed on the undersurface of cover plate 10, to permit cover plate 10 to snugly fit against the upper surface of lock plate 19. The threaded shaft portions extending downwardly from knob 11 are engaged into threaded openings 34 in plug plate 17 to hold the entire assembly together. The completed assembly may then be attached to a dividing and rounding machine according to the techniques which are known, by engagement into keyed opening 47 and by utilizing threaded fasteners engaged into threaded openings 33 of plug plate 17.

In operation, the assembly may be readily removed from a dividing and rounding machine by simply detaching the threaded fasteners which engage openings 33 in plug plate 17, and by rotating the assembly to disengage the keyed slot 47. Once the divider assembly has been disengaged from the machine, it may be readily disassembled by merely loosening knobs 11. When knobs 11 have been reduced all of the layered plates may be lifted away from the assembly for cleaning or maintenance. The divider blade 51 may be lifted from the assembly, and each of the plug stems 55 and plugs to which they are attached may be removed for cleaning. The divider assembly may be reassembled by reversing the process steps, to complete the cleaning process. In practice, it is seldom necessary to remove divider plate 16 from its fixed attachment with divider blade 51, so the entire divider assembly may be disassembled for cleaning by the mere expedient of loosening the two knobs 11. It has been found that this construction greatly simplifies and improves the maintenance and cleaning operations associated with the divider assembly.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A divider assembly for removable attachment to a dividing and rounding machine, comprising:
   a) a divider blade having a plurality of segments formed into a circular geometric pattern with respective open areas therebetween;
   b) a circular divider plate affixed to said divider blade, said divider plate having a neck projecting from its center, with means for attachment to said dividing and rounding machine, said divider plate further having openings therethrough generally aligned with said divider blade open areas;
   c) a plurality of plugs shaped to fit within the respective open areas in said divider blade, each of said plugs having a stem affixed thereto, each stem having an upper end having a groove therein, whereby said stem upper ends project through said divider plate openings;
   d) a plug plate overlaying said divider plate, said plug plate having a central opening for the passage of said divider plate neck, said plug plate further having a plurality of openings respectively alignable with said plurality of stems, whereby said stem upper end grooves project above said plug plate; and
   e) a lock plate overlaying said plug plate, said lock plate having a plurality of keyhole-shaped openings therethrough respectively alignable with the upper ends of said stems, whereby the lock plate is slidably engageable with the respective grooves in the upper ends of said stems.

2. The apparatus of claim 1, further comprising a cover plate overlaying said lock plate, said cover plate including means for removably affixing said cover plate, said lock plate and said plug plate together.

3. The apparatus of claim 2, wherein said lock plate keyhole openings each further comprise an enlarged portion sized to accept one of said stems, and a reduced portion sized to engage into said stem upper groove.

4. The apparatus of claim 3, wherein said means for removably affixing further comprises a knob above said cover plate and a threaded shaft extending downwardly from said knob for engagement with said plug plate.

5. The apparatus of claim 4, further comprising threaded openings in said plug plate and respective aligned openings in said lock plate and said cover plate, whereby means for attachment to said dividing and rounding machine may be threadably engaged to said plug plate through said lock plate and said cover plate.

6. A divider assembly for removable attachment to a dividing and rounding machine, comprising:
   a) a divider blade having a plurality of blade segments arranged in a geometric pattern having open areas therebetween;
   b) a plurality of plugs respectively shaped to fit within said open areas, each of said plugs having a stem affixed thereto at a first stem end, and having a second stem end with a circumferential groove proximate said second end and a circumferential shoulder adjacent said groove;
   c) a divider plate affixed to said divider blade, said divider plate having a plurality of openings therethrough for receiving said stems;
   d) a plug plate overlaying said divider plate, said plug plate having a plurality of openings therethrough for receiving said circumferential shoulders of said stems;
   e) a lock plate overlaying said plug plate, said lock plate having a plurality of openings therethrough for receiving said stem ends, each of said openings having a reduced size portion for engaging said circumferential grooves; and
   f) a cover plate overlaying said lock plate, said cover plate having means for attachment to said plug plate.

7. The apparatus of claim 6, wherein said lock plate plurality of openings each further comprise a first circular opening and an intersecting second circular opening of lesser diameter than the first opening whereby the second opening comprises said reduced size portion.

8. The apparatus of claim 7, wherein all of said second circular openings are uniformly aligned relative to said first circular openings.

9. The apparatus of claim 8, wherein said means for attachment on said cover plate further comprises threaded shafts and knobs, and aligned openings in said cover plate, said lock plate, and said plug plate, said plug plate openings being threaded to receive said threaded shafts.

10. The apparatus of claim 9, wherein said cover plate and said lock plate are constructed from plastic material.

* * * * *